(12) United States Patent
Grigsby et al.

(10) Patent No.: US 7,556,093 B2
(45) Date of Patent: Jul. 7, 2009

(54) DOWNHOLE FIBER OPTIC WET CONNECT AND GRAVEL PACK COMPLETION

(75) Inventors: Tommy Grigsby, Houma, LA (US); Bruce Techentien, Houston, TX (US); David Henderson, Tioga, TX (US); Bryon Mullen, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 11/560,724

(22) Filed: Nov. 16, 2006

(65) Prior Publication Data

US 2007/0081768 A1 Apr. 12, 2007

Related U.S. Application Data

(62) Division of application No. 10/680,625, filed on Oct. 7, 2003, now Pat. No. 7,165,892.

(51) Int. Cl.
*E21B 17/02* (2006.01)
(52) U.S. Cl. ..................... 166/242.6; 166/183
(58) Field of Classification Search ............ 166/250.01, 166/66, 179, 183, 129, 188, 242.1, 242.6, 166/242.7; 439/201, 577
See application file for complete search history.

(56) References Cited

U.S. PATENT DOCUMENTS

| 4,134,455 | A | 1/1979 | Read |
| 4,375,237 | A | 3/1983 | Churchman |
| 4,442,893 | A | 4/1984 | Foust |
| 4,483,584 | A | 11/1984 | Gretsy |
| 4,624,309 | A | 11/1986 | Schnatzmeyer |
| 4,666,241 | A | 5/1987 | Caron |
| 4,690,212 | A | 9/1987 | Termohlen |

(Continued)

FOREIGN PATENT DOCUMENTS

GB 2318397 4/1998

(Continued)

OTHER PUBLICATIONS

Office Action issued for U.S. Appl. No. 10/873,849 dated Sep. 12, 2007 (12 pages).

(Continued)

*Primary Examiner*—Jennifer H Gay
*Assistant Examiner*—Daniel P Stephenson
(74) *Attorney, Agent, or Firm*—Marlin R. Smith

(57) ABSTRACT

A downhole fiber optic wet connect and gravel pack completion. In a described embodiment, a system for making fiber optic connections in a subterranean well includes a first fiber optic connector positioned in the well and a second fiber optic connector operatively connected to the first fiber optic connector after the first fiber optic connector is positioned in the well. A method of monitoring a subterranean well includes the steps of: positioning a fiber optic line in the well, the fiber optic line extending in a formation intersected by the well; positioning another fiber optic line in the well, the fiber optic line extending to a remote location; operatively connecting the fiber optic lines while the fiber optic lines are in the well; and monitoring a well parameter using a sensor operatively coupled to the fiber optic line extending in the formation.

19 Claims, 8 Drawing Sheets

U.S. PATENT DOCUMENTS

| | | | |
|---|---|---|---|
| 4,756,595 | A | 7/1988 | Braun et al. |
| 4,757,859 | A | 7/1988 | Schnatzmeyer |
| 4,824,198 | A | 4/1989 | Anderton |
| 4,825,946 | A | 5/1989 | Schnatzmeyer |
| 4,828,027 | A | 5/1989 | Schnatzmeyer |
| 4,846,269 | A | 7/1989 | Schnatzmeyer |
| 4,887,883 | A | 12/1989 | Darbut et al. |
| 4,921,438 | A | 5/1990 | Godfrey et al. |
| 5,048,610 | A | 9/1991 | Ross et al. |
| 5,243,681 | A | 9/1993 | Bowen et al. |
| 5,251,708 | A | 10/1993 | Perry et al. |
| 5,435,351 | A | 7/1995 | Head |
| 5,440,665 | A | 8/1995 | Ray et al. |
| 5,505,260 | A | 4/1996 | Anderson et al. |
| 5,577,925 | A | 11/1996 | Schnatzmeyer et al. |
| 5,645,438 | A | 7/1997 | Cairns |
| 5,645,483 | A | 7/1997 | Cushman |
| 5,727,630 | A | 3/1998 | Brammer |
| 5,778,978 | A | 7/1998 | Crow |
| 5,803,167 | A | 9/1998 | Bussear et al. |
| 5,825,963 | A | 10/1998 | Burgett |
| 5,831,156 | A | 11/1998 | Mullins |
| 5,947,198 | A | 9/1999 | McKee et al. |
| 6,006,828 | A | 12/1999 | Kluth et al. |
| 6,017,227 | A | 1/2000 | Cairns et al. |
| 6,062,073 | A | 5/2000 | Patton et al. |
| 6,152,608 | A | 11/2000 | Ghara et al. |
| 6,186,229 | B1 | 2/2001 | Martin et al. |
| 6,281,489 | B1 | 8/2001 | Tubel et al. |
| 6,302,203 | B1 | 10/2001 | Rayssiguier et al. |
| 6,332,787 | B1 | 12/2001 | Barlow et al. |
| 6,349,770 | B1 | 2/2002 | Brooks et al. |
| 6,378,610 | B2 | 4/2002 | Rayssiguier et al. |
| 6,439,778 | B1 | 8/2002 | Cairns |
| 6,464,405 | B2 | 10/2002 | Cairns et al. |
| 6,527,441 | B1 | 3/2003 | Cranch et al. |
| 6,568,481 | B2 | 5/2003 | Koehler et al. |
| 6,666,274 | B2 | 12/2003 | Hughes |
| 6,684,950 | B2 | 2/2004 | Patel |
| 6,736,545 | B2 | 5/2004 | Cairns et al. |
| 6,758,271 | B1 | 7/2004 | Smith |
| 6,758,272 | B2 * | 7/2004 | Bixenman et al. .......... 166/255.1 |
| 6,766,853 | B2 | 7/2004 | Resterick et al. |
| 6,776,636 | B1 * | 8/2004 | Cameron et al. ............. 439/191 |
| 6,837,310 | B2 | 1/2005 | Martin |
| 6,874,361 | B1 | 4/2005 | Meltz et al. |
| 6,933,491 | B2 | 8/2005 | Maida et al. |
| 6,951,252 | B2 | 10/2005 | Restarick |
| 6,983,796 | B2 | 1/2006 | Bayne et al. |
| 7,080,940 | B2 | 7/2006 | Gotthold et al. |
| 7,191,832 | B2 | 3/2007 | Grigsby |
| 7,228,898 | B2 * | 6/2007 | Grigsby et al. ........... 166/242.6 |
| 2002/0014340 | A1 | 2/2002 | Johnson |
| 2002/0125008 | A1 | 9/2002 | Wetzel et al. |
| 2002/0162666 | A1 | 11/2002 | Koehler et al. |
| 2003/0141075 | A1 | 7/2003 | Bixenman et al. |
| 2003/0192708 | A1 | 10/2003 | Koehler et al. |
| 2003/0196820 | A1 | 10/2003 | Patel |
| 2003/0213598 | A1 | 11/2003 | Hughes |
| 2004/0013391 | A1 | 1/2004 | Joseph, II |
| 2004/0065439 | A1 | 4/2004 | Tubel et al. |
| 2004/0173350 | A1 | 9/2004 | Wetzel et al. |
| 2004/0256127 | A1 | 12/2004 | Brenner et al. |
| 2004/0256137 | A1 | 12/2004 | Bertini et al. |
| 2005/0092501 | A1 | 5/2005 | Chavers et al. |
| 2005/0109518 | A1 | 5/2005 | Blacklaw |
| 2005/0194150 | A1 | 9/2005 | Ringgenberg |
| 2005/0213897 | A1 | 9/2005 | Palmer et al. |
| 2005/0232548 | A1 | 10/2005 | Ringgenberg |
| 2005/0281511 | A1 | 12/2005 | Ringgenberg |
| 2006/0153487 | A1 | 7/2006 | McLellan |

FOREIGN PATENT DOCUMENTS

| | | |
|---|---|---|
| WO | WO8602173 | 4/1986 |
| WO | WO03046428 | 6/2003 |

OTHER PUBLICATIONS

Office Action issued Nov. 24, 2008, for U.S. Appl. No. 10/873,849, 13 pages.
Intelligent Wells, "Optical Fiber Technology," dated Oct. 2002.
Intelligent Wells, "Oil Field Applications of Hydroptics Technology," dated Oct. 2002.
World Oil, "World's First Multiple Fiber-Optic Intelligent Well," dated Mar. 2003.
Underwater Magazine, "Underwater Mateable Connectors in the Military and Telecom Sectors," dated Sep./Oct. 2002.
Sea Technology, "The Ruggedization of Hybrid Wet-Mate Connectors," dated Jul. 2000.
Sea Technology, "Optical Fiber and Connectors: Critical for Future Subsea Systems," undated.
OTC 15323, "The Development and Application of HT/HP Fiber-Optic Connectors for Use on Subsea Intelligent Wells," dated 2003.
Journal of Petroleum Technology, "Development of HP/HT Fiber-Optic Connectors for Subsea Intelligent Wells," dated Aug. 2003.
Sea Technology, "Hybrid Wet-Mate Connectors: 'Writing the Next Chapter'," dated Jul. 1997.
Tronic, "Tronic Fibre Optic Wellhead Feedthrough Connectors," undated.
Tronic, "Firefly Project," undated.
OTC 13235, "Extending Tieback Distances: Wet-Mate Connectors, Enabling Technologies for Critical Systems Developments," dated 2001.
Ocean Design, "Underwater Mateable Connectors: Enabling Technology and the Next Step in Performance for Navy and Telecom Applications," Presented at Underwater Intervention Conference, 2002.
W Magazine, "Intelligent Well Completion, the Next Steps," dated Sep. 2002.
Production Optimization, "Intelligent Completions," undated.
Seacon, "Microstar, 4-Channel, Wet-Mate, Optical Connector," undated.
Ocean Design, Inc., "Ocean Design Introduces New I-Conn Product Line," dated Jul. 22, 2002.
Weatherford, "Intelligent Well Briefing," dated May 14, 2003.
"Pioneering Fibre Optic Completion Installation in the Mahogany Field, Offshore Trinidad," undated.
PES, "Model FO Fibre Optic Orientating Disconnect Head," dated Oct. 23, 2000.
SPE 71676, "The Use of Fiber-Optic Distributed Temperature Sensing and Remote Hydraulically Operated Interval Control Valves for the Management of Water Production in the Douglas Field," dated 2001.
SPE 84324, "Brunei Field Trial of a Fibre Optic Distributed Temperature Sensor (DTS) System in a 1,000 m Open Hole Horizontal Oil Producer," dated 2003.
Halliburton, "X-Line® and R-Line® Landing Nipples and Lock Mandrels; Set and Lock Reliability in Subsurface Flow Control Equipment With a Total Completion Package," dated Mar. 1997.
Focal Technologies Corporation, Product Brochure for Model286, dated Apr. 15, 2003.
Office Action for U.S. Appl. No. 10/680,053, dated Jun. 11, 2004.
U.S. Appl. No. 10/680,053, filed Oct. 7, 2003.
The Expo Group Brochure, "Tronic Fibre Optic Wellhead Feedthrough Connectors," undated.
Seacon Brochure, "Fiber Optic Connectors," undated.
Ocean Design, Inc. Brochure, "NRH Connector," undated.
Ocean Design, Inc. Brochure, "Hybrid Wet-Mate," 2000.
Ocean Design, Inc. Brochure, "I-Conn; Wet-Mateable Optical Connector," 2000.
Seacon Advanced Products Data Sheets, pp. 22-1 through 22-20.
International Search Report for PCT/US04/01857.
Office Action for U.S. Appl. No. 10/680,053, dated Nov. 8, 2004.

Search Report for United Kingdom Application No. GB 0507890.2.
Office Action for U.S. Appl. No. 10/680,053, dated Mar. 8, 2005.
Search Report for PCT/US04/01863.
Search Report for PCT/US04/01856.
Norfolk Wire & Electronics, "Optical Fiber Splice Protectors- FSP," dated 2003.
Office Action for U.S. Appl. No. 10/680,440, dated Jul. 6, 2005.
Office Action for U.S. Appl. No. 10/680,053, dated Jul. 6, 2005.
Otis Engineering drawing No. 41UP58701 dated May 4, 1993.
Halliburton Energy Services drawing No. 42 oo 210 dated Apr. 7, 2001.
Halliburton presentation entitled, "DTS Conceptual Completions," Dec. 3, 2002.
Halliburton presentation entitled, "Greater Plutonio Completions Workshop," dated Mar. 12, 2003.
Office action for U.S. Appl. No. 10/680,053, dated Oct. 21, 2005.
Office action for U.S. Appl. No. 11/038,369, dated Feb. 14, 2006.
Office action for U.S. Appl. No. 10/680,440, dated Jan. 13, 2006.
Office action for U.S. Appl. No. 10/790,908, dated Mar. 14, 2006.
Office action for U.S. Appl. No. 10/828,085, dated Mar. 22, 2006.
International Preliminary Report on Patentability for PCT/US2004/001863.
International Preliminary Report on Patentability for PCT/US2004/001856.
International Preliminary Report on Patentability for PCT/US2004/001857.
Written Opinion for PCT/US2004/001863.
Written Opinion for PCT/US2004/001856.
Written Opinion for PCT/US2004/001857.
Office Action for U.S. Appl. No. 10/873,849, dated May 5, 2006.
Office Action for U.S. Appl. No. 10/680,440, dated Jul. 5, 2006.
Office Action for U.S. Appl. No. 11/038,369, dated Jul. 11, 2006.

* cited by examiner

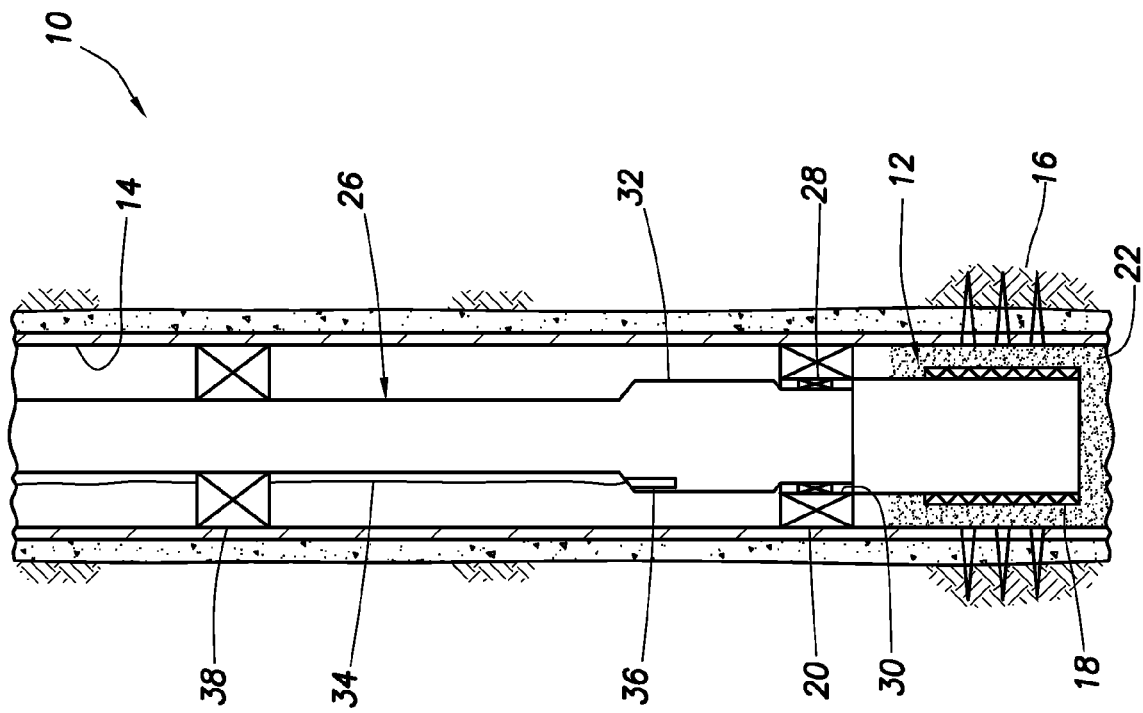
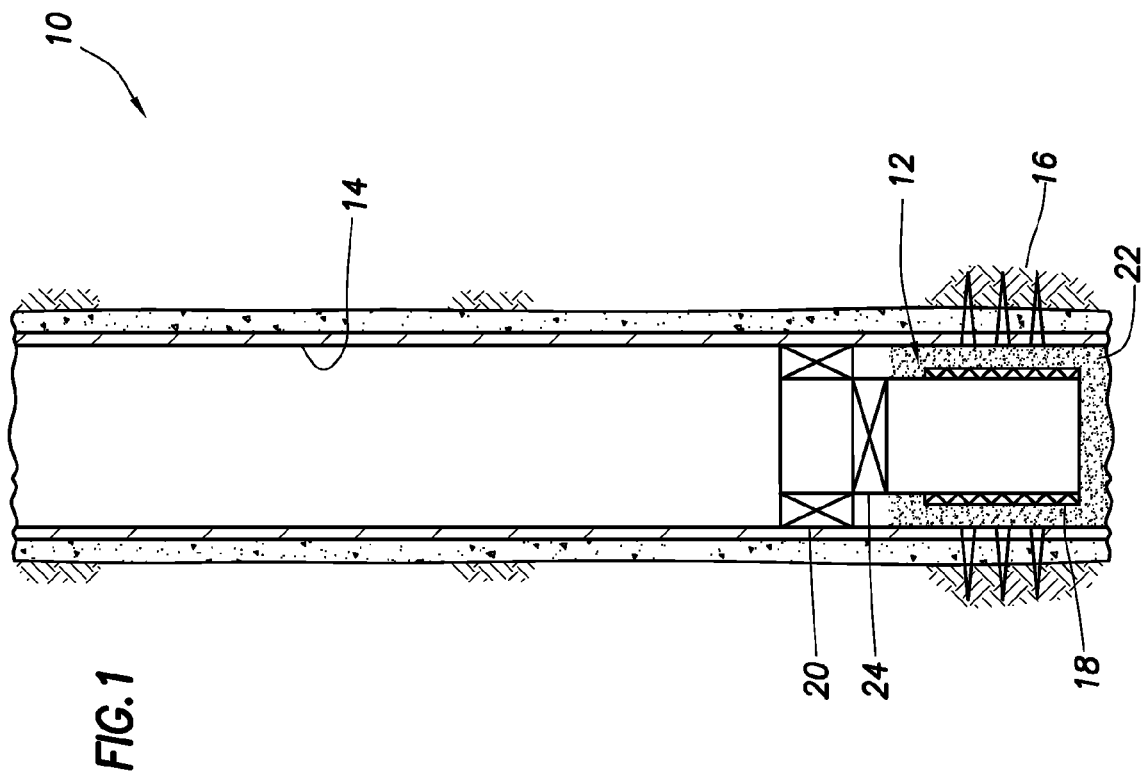

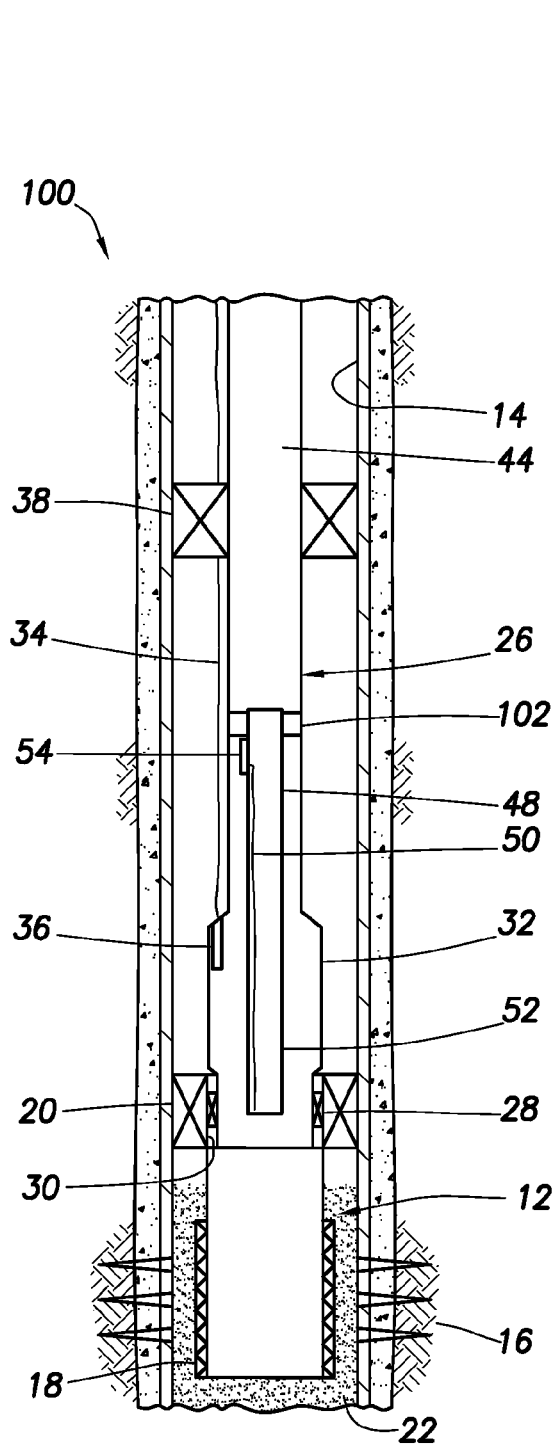

DOWNHOLE FIBER OPTIC WET CONNECT AND GRAVEL PACK COMPLETION

CROSS-REFERENCE TO RELATED APPLICATIONS

The present application is a division of prior application Ser. No. 10/680,625 filed on Oct. 7, 2003 now U.S. Pat No 7,165,892. The present application is also related to the following applications filed on Oct. 7, 2003: application Ser. No. 10/680,053 and application Ser. No. 10/680,440. The disclosures of these three related applications are incorporated herein by this reference.

BACKGROUND

The present invention relates generally to equipment utilized and operations performed in conjunction with subterranean wells and, in an embodiment described herein, more particularly provides a downhole fiber optic wet connect and gravel pack completion.

It would be very desirable to be able to use a fiber optic line to monitor production from a well, for example, to monitor water encroachment, identify production sources, evaluate stimulation treatments and completion practices, etc. It is known to use fiber optic lines to transmit indications from downhole sensors, to communicate in the downhole environment and to use a fiber optic line as a sensor.

However, fiber optic lines may be damaged in operations such as gravel packing, expanding tubulars downhole, etc. For this reason, it would be beneficial to be able to replace portions of a fiber optic line downhole, or to install a substitute fiber optic line. This replacement operation would be more economical if a completion string did not have to be retrieved from a well to replace/install the fiber optic line.

Furthermore, it is sometimes desirable to complete a well in sections or intervals, for example, where a horizontal well is gravel packed in sections, or where zones intersected by a vertical well are separately gravel packed. In these cases, it would be beneficial to be able to connect separate sections of fiber optic line to each other downhole, so that the fiber optic line may be installed in sections along with the corresponding sections of the completion.

SUMMARY

In carrying out the principles of the present invention, in accordance with an embodiment thereof, a system is provided which permits fiber optic connectors to be connected downhole. Using this system, separate portions of fiber optic line may be installed in a well, and then operatively connected to each other. Furthermore, a fiber optic line previously installed in a well can be replaced, without having to pull a production tubing string out of the well.

In one aspect of the invention, a system for making fiber optic connections in a subterranean well is provided. The system includes a fiber optic connector positioned in the well. Another fiber optic connector is operatively connected to the first fiber optic connector after the first fiber optic connector is positioned in the well.

In another aspect of the invention, a system for making fiber optic connections in a subterranean well includes an assembly positioned in the well, the assembly including a fiber optic connector. Another assembly is positioned in the well which includes another fiber optic connector. An orienting device orients the assemblies relative to each other, thereby aligning the fiber optic connectors.

In yet another aspect of the invention, a method of making fiber optic connections in a subterranean well is provided. The method includes the steps of: positioning an assembly in the well, the assembly including a fiber optic connector; positioning another assembly in the well which includes another fiber optic connector; orienting the assemblies in the well, thereby aligning the fiber optic connectors; and then operatively connecting the fiber optic connectors in the well.

In a further aspect of the invention, an apparatus for making a fiber optic connection in a subterranean well is provided. The apparatus includes an outer housing having a sidewall, and a passage extending through the housing. A fiber optic connector is positioned in the housing sidewall. Another fiber optic connector is received within the passage. The fiber optic connectors are operatively connectable after the apparatus is positioned in the well.

In a still further aspect of the invention, a system for making fiber optic connections in a subterranean well includes a packer assembly having an orienting device and a fiber optic connector. A tubular string of the system includes another orienting device and another fiber optic connector. The orienting devices align the fiber optic connectors for operative connection therebetween when the tubular string is engaged with the packer in the well.

In yet another aspect of the invention, a system for making fiber optic connections in a subterranean well is provided. The system includes a tubular string having a passage formed through the tubular string, and a fiber optic connector and an assembly received in the passage, the assembly having another fiber optic connector.

A further aspect of the invention includes a method of monitoring a subterranean well. The method includes the steps of: positioning a fiber optic line in the well, the fiber optic line extending in a formation intersected by the well; positioning another fiber optic line in the well, the fiber optic line extending to a remote location; operatively connecting the fiber optic lines while the fiber optic lines are in the well; and monitoring a well parameter using a sensor operatively coupled to the fiber optic line extending in the formation.

These and other features, advantages, benefits and objects of the present invention will become apparent to one of ordinary skill in the art upon careful consideration of the detailed description of representative embodiments of the invention hereinbelow and the accompanying drawings.

BRIEF DESCRIPTION OF THE DRAWINGS

FIGS. 1-4 are successive schematic partially cross-sectional views of a system and method embodying principles of the present invention;

FIG. 7 is a schematic partially cross-sectional view of another system and method embodying principles of the invention; and FIGS. 8-11 are successive schematic partially cross-sectional views of yet another system and method embodying principles of the invention.

DETAILED DESCRIPTION

Figure 3:
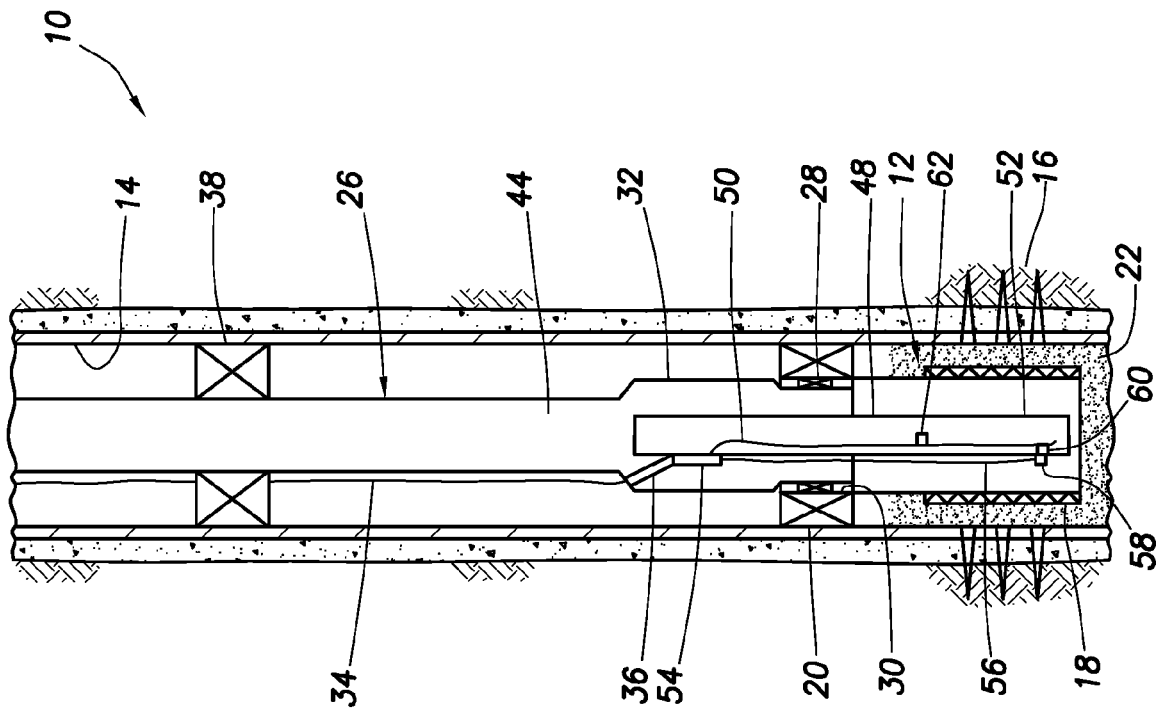

Representatively illustrated in FIGS. 1-4 is a system 10 and method which embody principles of the present invention. In the following description of the system 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

The system 10 and method are used to demonstrate how the principles of the invention may provide various benefits in a well monitoring application. However, it should be clearly understood that the principles of the invention are not limited to use with the system 10 and method depicted in FIGS. 1-4, but are instead adaptable to a wide variety of applications. Therefore, the details of the system 10 and method of FIGS. 1-4, or of any of the other systems and methods described herein, are not to be taken as limiting the principles of the invention.

As depicted in FIG. 1, a gravel packing assembly 12 has been positioned in a wellbore 14 which intersects a formation or zone 16. All or part of the gravel packing assembly 12 may be positioned in a cased or uncased portion of the wellbore 14.

The assembly 12 includes a well screen 18 and a gravel pack packer 20. The packer 20 is set in the wellbore 14, and the annulus between the well screen 18 and the wellbore is packed with gravel 22, using techniques well known to those skilled in the art. A fluid loss control device 24 may be used to prevent fluid in the wellbore 14 from flowing into the formation 16 after the gravel packing operation.

As depicted in FIG. 2, a tubular string 26, such as a production tubing string, is conveyed into the wellbore 14 and engaged with the gravel packing assembly 12. Seals 28 carried on the tubular string 26 sealingly engage a seal bore 30 of the assembly 12, such as a polished bore of the packer 20.

The tubing string 26 includes a generally tubular housing assembly or receptacle 32. A fiber optic line 34 extends from a remote location (not shown), such as the earth's surface or another location in the well, to a fiber optic connector 36 located in the housing assembly 32.

As used herein, the term "fiber optic connector" is used to indicate a connector which is operably coupled to a fiber optic line so that, when one fiber optic connector is connected to another fiber optic connector, light may be transmitted from one fiber optic line to another fiber optic line. Thus, each fiber optic connector has a fiber optic line operably coupled thereto, and the fiber optic lines are connected for light transmission therebetween when the connectors are connected to each other.

Although in the following description of the system 10 and associated method only one fiber optic line 34 is specifically described, it is to be clearly understood that any number of fiber optic lines may be used in the system and method, and any number of connections between fiber optic lines may be made downhole in keeping with the principles of the invention. For example, in a seismic application, there may be approximately 12 or more fiber optic lines 34 connected downhole.

In addition, other types of lines may be used in conjunction with the fiber optic line 34. For example, hydraulic and electrical lines may be connected downhole along with the fiber optic line 34. These other types of lines may be connected downhole using the same connectors as the fiber optic line, or other additional connectors may be used.

The tubing string 26 may also include a packer 38 which is set in the wellbore 14 to secure the tubing string. Note that the fiber optic line 34 extends longitudinally through the packer 38. Alternatively, the packer 38 could be positioned below the housing 32, in which case the fiber optic line 34 may not extend through the packer.

In FIG. 3, a conveyance 40 is used to transport another assembly 42 into an inner passage 44 extending through the tubing string 26 and housing 32. Representatively, the conveyance 40 is a coiled tubing string, but any other conveyance, such as wireline, slickline, segmented tubing, etc., may be used if desired.

The assembly 42 includes a running tool 46 and a probe 48. The probe 48 has a fiber optic line 50 extending longitudinally within, or external to, a perforated tubular member 52 attached to the running tool 46. The fiber optic line 50 is operatively coupled to another fiber optic connector 54. As discussed above, more than one fiber optic line 50 may be used in the system 10, and other types of lines (such as hydraulic and/or electrical) may be used and connected using the connectors 36, 54.

When the probe 48 is appropriately positioned in the housing 32, the probe is rotationally oriented relative to the housing, so that the fiber optic connectors 36, 54 are aligned with each other, and the probe is anchored in place relative to the housing. In this position, the fiber optic line 50 extends longitudinally within the gravel packing assembly 12.

Pressure is applied via the coiled tubing string 40 and through the running tool 46 to the housing 32, causing the fiber optic connector 36 to displace toward the fiber optic connector 54. The fiber optic connectors 36, 54 are, thus, operatively connected. The fiber optic line 50 may now be used to monitor one or more parameters of the well environment.

For example, the fiber optic line 50 may be configured to sense temperature along its length. It is well known to those skilled in the art that a fiber optic line may be used as a distributed temperature sensor. By positioning the fiber optic line 50 longitudinally within the gravel packing assembly 12, the fiber optic line can sense temperature distribution along the wellbore 14 as fluid flows from the formation 16 therein. An influx of water from the formation 16 into the wellbore 14 may be located by monitoring the temperature distribution along the gravel packing assembly 12 using the fiber optic line 50.

Figure 4:
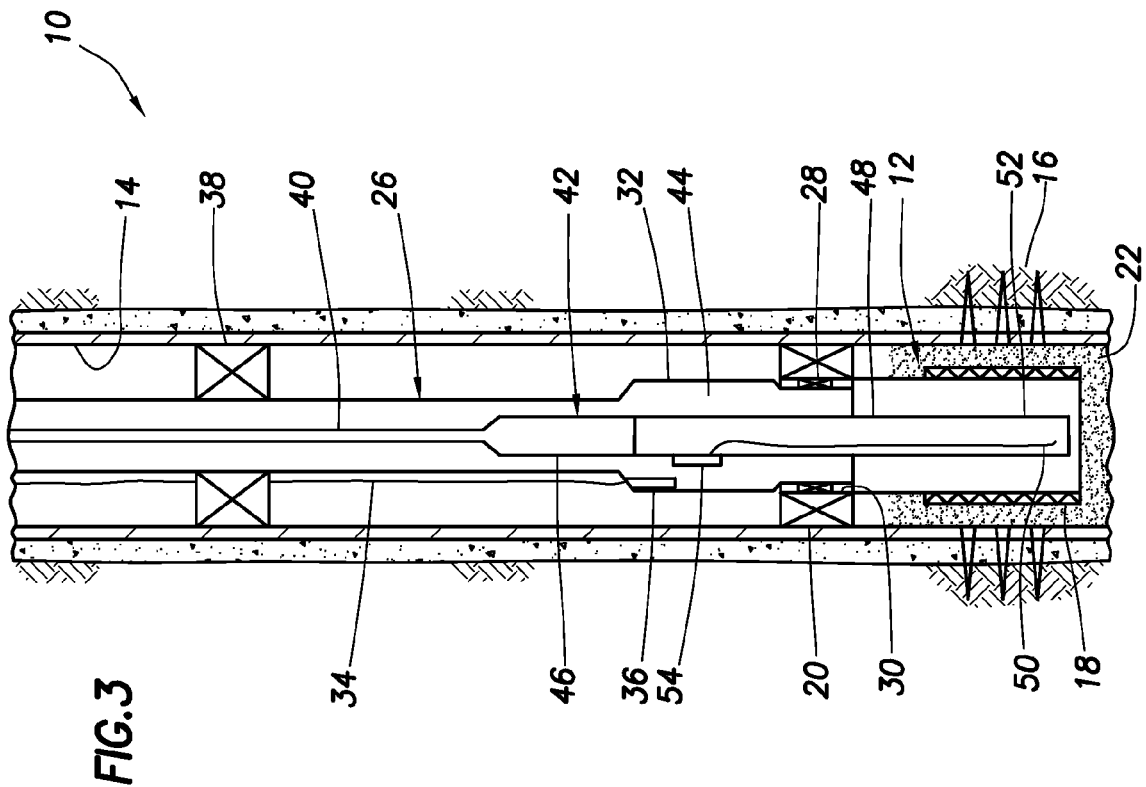

As depicted in FIG. 4, the running tool 46 has been removed from the well, leaving the probe 48 anchored in the passage 44, and with the fiber optic connectors 36, 54 connected. The connector 36 is shown in FIG. 4 as having been rotated relative to the housing 32 into engagement with the other connector 54. However, it should be clearly understood that either of the connectors 36, 54 may be displaced in any manner in order to bring the connectors into operative engagement.

The probe 48 as depicted in FIG. 4 has an optional fiber optic line 56 which extends external to the tubular member 52. This demonstrates that the fiber optic lines 50, 56 may be located in any position on the probe 48. In addition, separate internal and external sensors 58, 60, 62 are connected to the fiber optic lines 50, 56, demonstrating that the lines themselves are not necessarily sensors in the system 10. Sensors 58, 60, 62 may be used to sense any well parameter, such as pressure, temperature, seismic waves, radioactivity, water cut, flow rate, etc.

If the fiber optic lines 50, 56 or sensors 58, 60, 62 should fail, or different sensors need to be installed, or if for any other reason it is desired to retrieve the probe 48, the system 10 provides for convenient retrieval. The running tool 46 is again conveyed into the wellbore 14 and is engaged with the probe 48. Pressure is applied through the running tool 46 to the housing 32 to retract the fiber optic connector 36 out of engagement with the other fiber optic connector 54, the probe 48 is released from the housing 32, and the running tool and probe are retrieved from the well.

Figures 5A, 5B:
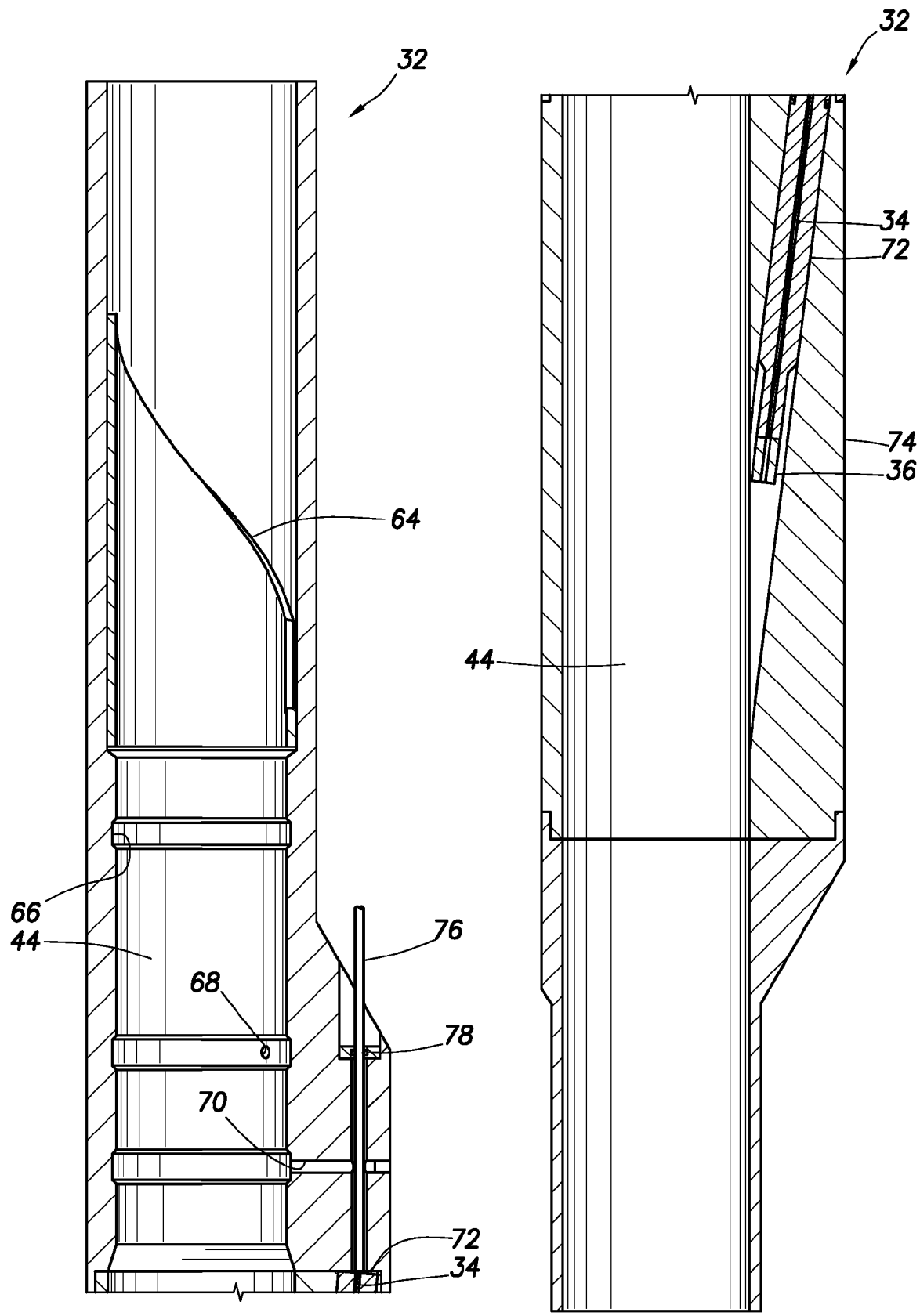
FIGS. 5A & B are enlarged cross-sectional views of a fiber optic wet connect apparatus embodying principles of the present invention.

Representatively illustrated in FIGS. 5A & B is a specific embodiment of the housing assembly 32. Of course, the principles of the invention are not limited to the details of this specific embodiment. Instead, many different forms of the housing 32 may be used, if desired. For example, the housing assembly 32 described below utilizes pressure to displace and operatively connect the fiber optic connectors 36, 54, but it will be readily appreciated that a fiber optic connector may be displaced mechanically, electrically, magnetically, etc., and other means may be used to operatively connect fiber optic connectors, in keeping with the principles of the invention.

The housing assembly 32 includes an orienting device 64 depicted as a helical profile having a vertically extending slot at a lower end thereof. This orienting device 64 is shown merely as an example of a variety of orienting devices which may be used. Any type of orienting device may be used in keeping with the principles of the invention. A latching profile 66 in the passage 44 is used to secure the probe 48 in the housing 32. Any type of securing means may be used in keeping with the principles of the invention.

Two fluid passages 68, 70 communicate with the inner passage 44. The passage 70 is in communication with an upper side of a piston 72 reciprocably received in a sidewall of the housing 32. Pressure applied to the passage 70 will bias the piston 72 downward. The other passage 68 is not completely visible in FIG. 5A, but it is in communication with a lower side of the piston 72, so that pressure applied to the passage 68 biases the piston to displace upward.

The fiber optic line 34 extends through an outer conduit 76 to the housing assembly 32. The conduit 76 may be, for example, tubing such as control line tubing, or a protective enclosure for the fiber optic line 34, etc. A seal 78 seals between the housing 32 and the conduit 76.

The fiber optic line 34 extends through the piston 72 to the fiber optic connector 36 positioned at a lower end of the piston. As the piston displaces downward in response to pressure applied to the passage 70, the connector 36 is also displaced downward, along with the conduit 76 which displaces through the seal 78.

As noted above, more than one fiber optic line 34 may be connected downhole using the connectors 36, 54, in which case the multiple fiber optic lines may extend through the piston 72 to the fiber optic connector at the lower end of the piston. Furthermore, other types of lines (such as hydraulic and/or electrical) may extend to the connector 36.

Figure 6A:
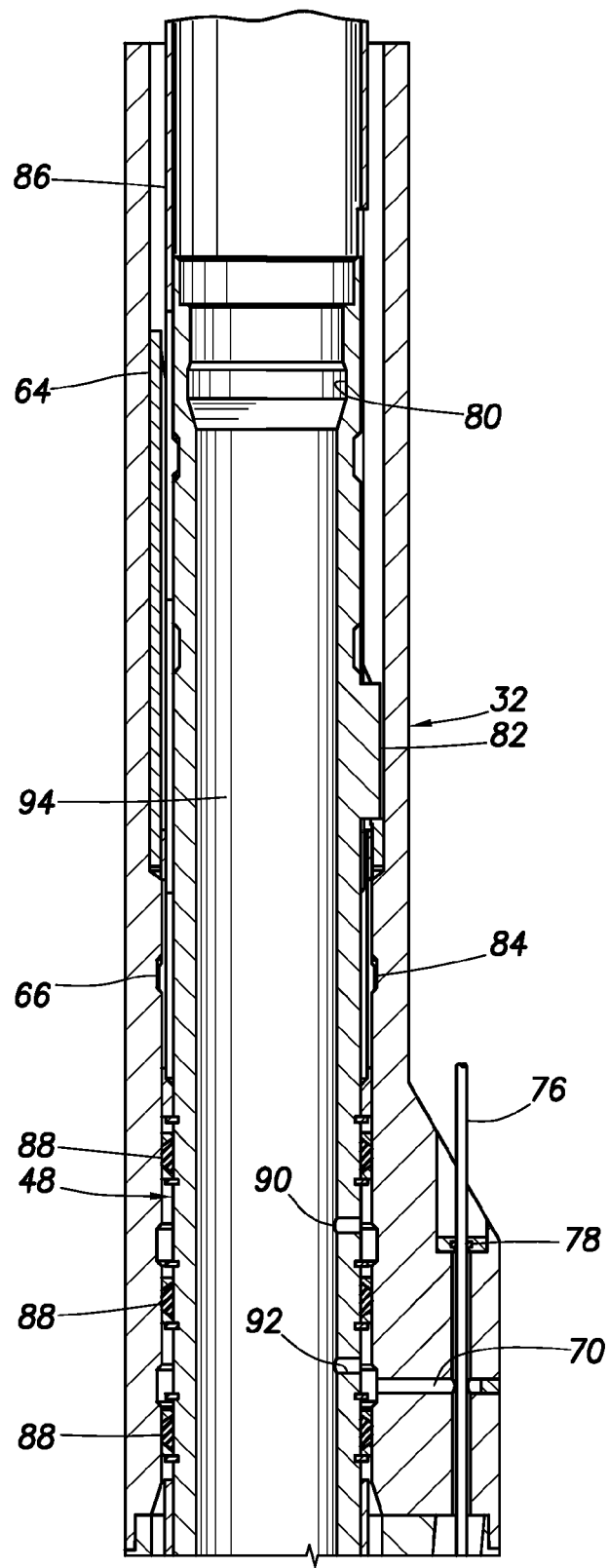
FIGS. 6A & B are cross-sectional views of the wet connect apparatus of FIGS. 5A & B with a fiber optic probe engaged therewith.
Figure 6B:
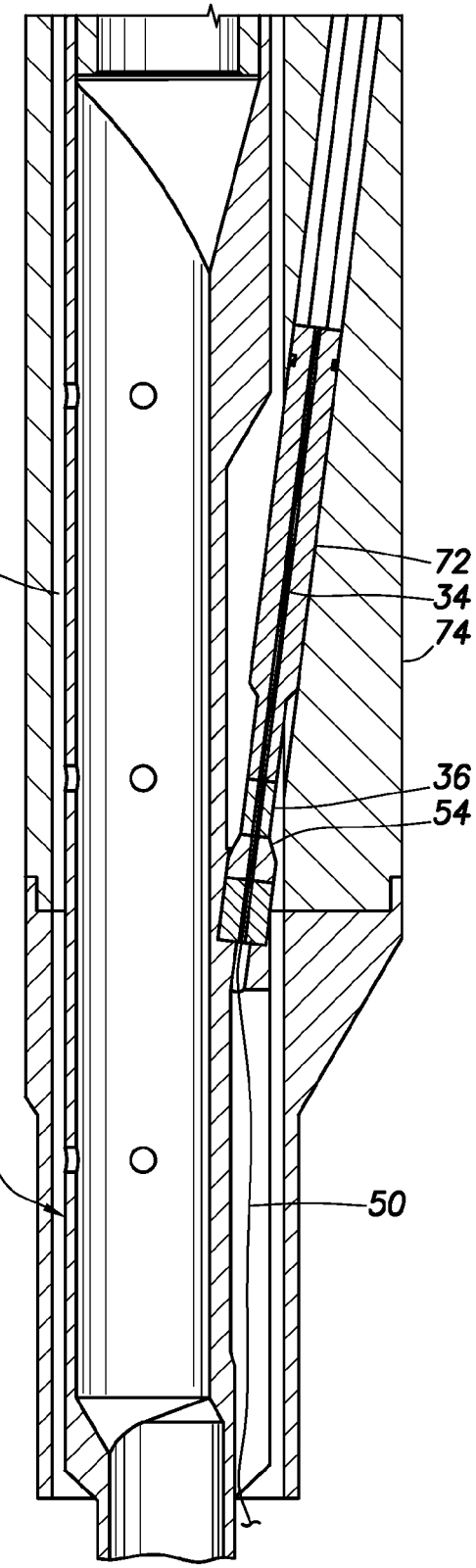

Referring now to FIGS. 6A & B, the housing assembly 32 is representatively illustrated after the probe 48 has been installed and secured in the passage 44. The running tool 46 (not shown in FIGS. 6A & B, see FIG. 3) is releasably attached to the probe 48 at a latching profile 80 when the probe 48 is installed in the housing assembly 32, and when the probe is retrieved from the housing assembly.

The probe 48 includes an orienting device 82 depicted in FIG. 6A as a lug engaged with the orienting profile 64. This engagement rotationally orients the probe 48 relative to the housing assembly 32, so that the fiber optic connector 54 carried on the probe is radially aligned with the fiber optic connector 36 in the housing sidewall 74. Again, any other means of orienting the probe 48 relative to the housing assembly 32, and any other means of aligning the connectors 36, 54, may be used in keeping with the principles of the invention.

A series of collets 84 are engaged in the profile 66. A sleeve 86 is displaced downwardly by the running tool 46 when it is desired to anchor the probe 48 in the passage 44 of the housing assembly 32. The sleeve 86 inwardly supports the collets 84, preventing their disengagement from the profile 66. When it is desired to retrieve the probe 48 from the housing assembly 32, the sleeve 86 is displaced upwardly, thereby permitting the collets 84 to displace inwardly when the probe is retrieved. Again, any other means of securing the probe 48 in the housing assembly 32 may be used in keeping with the principles of the invention.

A series of longitudinally spaced apart seals 88 on the probe 48 straddle the passages 68, 70. The probe 48 has openings 90, 92 which correspond to the respective passages 68, 70. The upper opening 90 is in communication with the passage 68, whereas the opening 92 is in communication with the passage 70.

In this configuration, pressure may be applied via the opening 92 to the passage 70, and then to the upper side of the piston 72 to displace it downwardly. Pressure may alternatively be applied via the opening go to the passage 68, and then to the lower side of the piston 72 to displace it upwardly. Thus, the connectors 36, 54 may be alternately connected and disconnected by applying pressure to corresponding alternate ones of the openings 90, 92.

If multiple fiber optic lines 34 are coupled to the connector 36, and multiple fiber optic lines 50 are coupled to the connector 54, then the application of pressure to the piston 72 may operate to alternately connect and disconnect these multiple fiber optic lines. If other types of lines are also, or alternatively, coupled to the connectors 36, 54, then these other types of lines may be connected and disconnected by application of pressure to alternating sides of the piston 72.

The running tool 46 includes the plumbing associated with directing pressure to the appropriate openings 90, 92. It will be appreciated that, when the probe 48 is to be installed in the housing assembly 32, the running tool will be configured to apply pressure to the opening 92, and when the probe is to be retrieved from the housing assembly, the running tool will be configured to apply pressure to the opening 90.

Referring additionally now to FIG. 7, another system 100 and method embodying principles of the present invention is representatively illustrated. The system 100 is similar in many respects to the system 10 described above, and so similar elements are indicated in FIG. 7 using the same reference numbers.

Instead of installing the probe 48 in the tubing string 26 after installing the tubing string in the well and engaging it with the gravel packing assembly 12, in the system 100 the probe 48 is secured in the tubing string 26 at the time the tubing string is installed in the well. The probe 48 is initially secured in the tubing string 26 with a latching device 102. After the tubing string 26 is engaged with the gravel packing assembly 12, the latching device 102 is released, permitting the probe 48 to displace downwardly into operative engagement with the housing assembly 32.

The latching device 102 could be released, for example, by applying pressure to the tubing string 26, to thereby pump the probe 48 into the housing assembly 32. This application of pressure could also serve to orient the probe 48 relative to the housing assembly 32 (aligning the fiber optic connectors 36, 54), anchor the probe relative to the housing assembly (such as, by displacing the sleeve 86 downward to support the collets 84) and displace the connector 36 into operative engagement with the connector 54.

Alternatively, a running tool conveyed by coiled tubing, wireline or slickline, etc. could be used if desired to displace the probe 48 into engagement with the housing assembly 32, and/or to retrieve the probe from within the housing assembly.

Any means of displacing the probe 48 in the passage 44 may be used in keeping with the principles of the invention.

As with the system 10 described above, multiple fiber optic lines may be connected and disconnected downhole using the connectors 36, 54, and other types of lines (such as hydraulic and/or electrical) may be connected and disconnected downhole using the connectors in the system 100.

Referring additionally now to FIGS. 8-11, another system 110 and method embodying principles of the invention is representatively illustrated. As depicted in FIG. 8, a gravel packing assembly 112 is installed in a wellbore 114 opposite a formation or zone 116 intersected by the wellbore. The gravel packing assembly 112 includes a well screen 118 and a gravel pack packer 120.

Gravel 122 is placed in the annulus formed between the screen 118 and the wellbore 114 using techniques well known to those skilled in the art. A fluid loss control device 124 may be used to prevent loss of fluid into the formation 116 from the wellbore 114.

The gravel packing assembly 112 is similar in many respects to the gravel packing assembly 12 used in the system 10 described above. However, the gravel packing assembly 112 used in the system 110 also includes an orienting device 126, a fiber optic line 128 and a fiber optic connector 130. These additional elements permit the fiber optic line 128 to be connected to other fiber optic lines subsequently installed in the wellbore 114.

The orienting device 126 may be similar to the helical profile and vertical slot of the orienting device 64 used in the housing assembly 32 described above. Other types of orienting devices may alternatively be used, if desired.

The fiber optic line 128 is operatively coupled to the fiber optic connector 130. From the fiber optic connector 130, the fiber optic line 128 extends through the packer 120 and longitudinally downward adjacent the screen 118. However, it should be understood that the fiber optic line 128 may extend internally, externally or within a sidewall of the screen 118. Preferably, the fiber optic line 128 extends longitudinally across the formation 116 intersected by the wellbore 114, so that a parameter of fluid flowing between the formation and the wellbore may be monitored along the length of the intersection between the formation and the wellbore.

Figure 9:
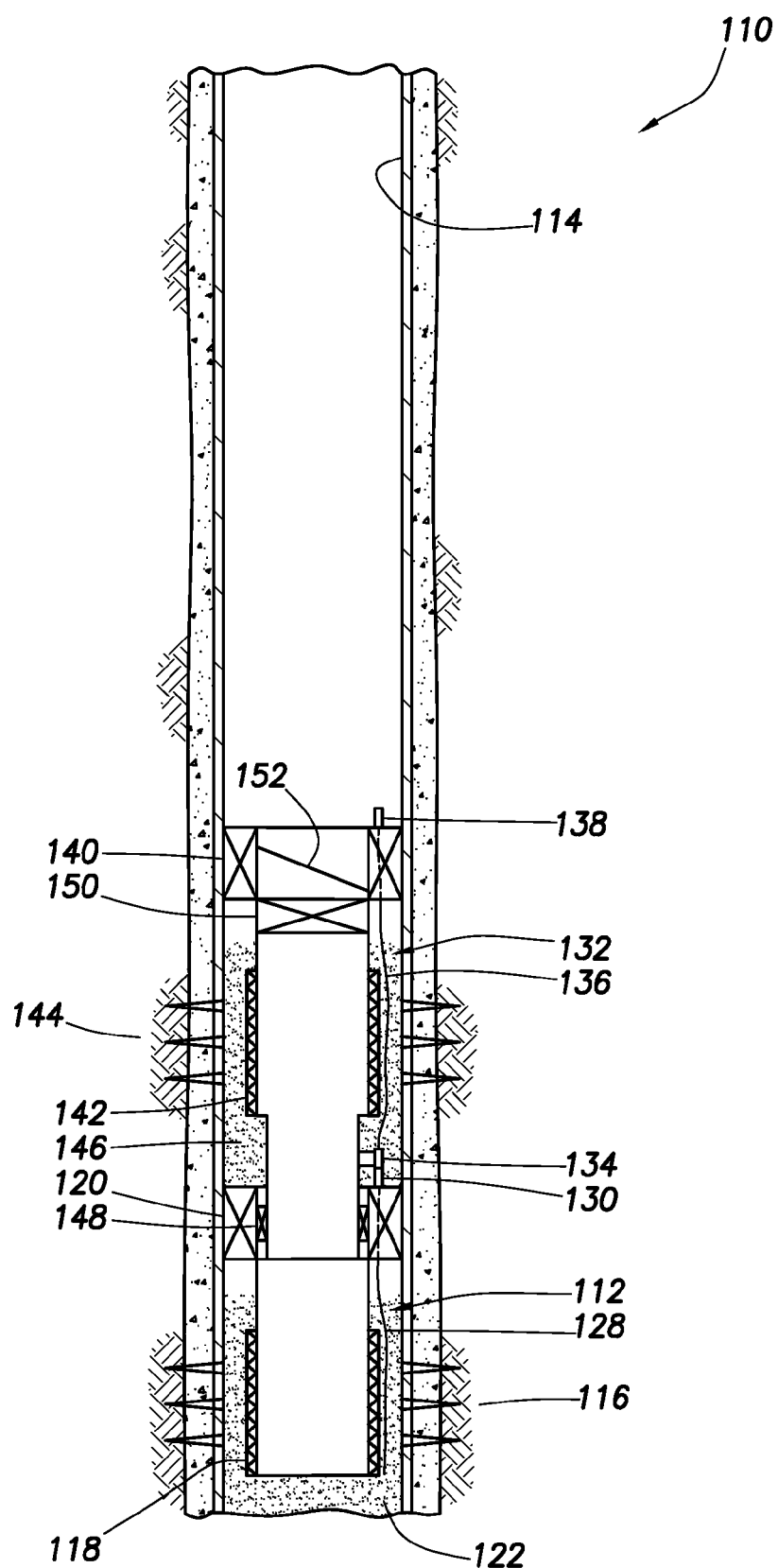

As depicted in FIG. 9, another gravel packing assembly 132 is installed in the wellbore 114 and engaged with the gravel packing assembly 112. Preferably, the gravel packing assembly 132 is secured to the gravel packing assembly 112 when the assemblies are engaged with each other, such as by using collets engaging an internal profile as described above, etc.

As the gravel packing assembly 132 is installed, it is rotationally oriented relative to the gravel packing assembly 112, so that the fiber optic connector 130 is aligned with another fiber optic connector 134 carried at a lower end of the gravel packing assembly 132. This rotational orientation is facilitated by an orienting device (not visible in FIG. 9) of the gravel packing assembly 132 engaging the orienting device 126 of the gravel packing assembly 112. For example, the gravel packing assembly 132 may have a lug thereon similar to the orienting device 82 of the probe 48 described above.

The fiber optic connector 134 is operably coupled to a fiber optic line 136 extending to another fiber optic connector 138 at an upper end of the gravel packing assembly 132. The fiber optic line 136 extends through a gravel pack packer 140 and longitudinally adjacent a well screen 142 of the gravel packing assembly 132. The screen 142 is positioned opposite another formation or zone 144 intersected by the wellbore 114.

As with the fiber optic line 128, the fiber optic line 136 preferably extends along the intersection between the formation 144 and the wellbore 114, so that it may be used to sense a parameter of fluid flowing between the formation and the wellbore along the length of the intersection. The fiber optic line 136 may be positioned externally, internally or within a sidewall of the screen 142. Each of the fiber optic lines 128, 136 may be used with one or more separate sensors connected thereto (such as the sensors 58, 60, 62 described above), and/or portions of the fiber optic lines may serve as sensors.

It may now be fully appreciated that the system 110 provides for convenient downhole interconnection of the fiber optic lines 128, 136 of the gravel packing assemblies 112, 132. Using the principles of the invention, it is not necessary to install a single continuous fiber optic line in a well to monitor separate portions of the well. Instead, separate fiber optic lines may be installed, and then connected downhole. This is very beneficial where, as in the system 110, different portions of the well are separately completed, gravel packed, etc. This is of particular benefit in highly deviated or horizontal wellbores where productive intervals are separately completed, or intervals are completed in separate sections.

In the system 110 as depicted in FIG. 9, gravel 146 is placed in the annulus between the screen 142 and the wellbore 114. Note that seals 148 carried at a lower end of the gravel packing assembly 132 sealingly engage a seal bore of the packer 120 of the gravel packing assembly 112. When the gravel packing operation is completed, a fluid loss control device 150 may be used to prevent loss of fluid from the wellbore 114 into the formations 116, 144.

The gravel packing assembly 132 includes another orienting device 152 at an upper end thereof. The orienting device 152 may be similar to the orienting device 64 described above.

Figure 10:
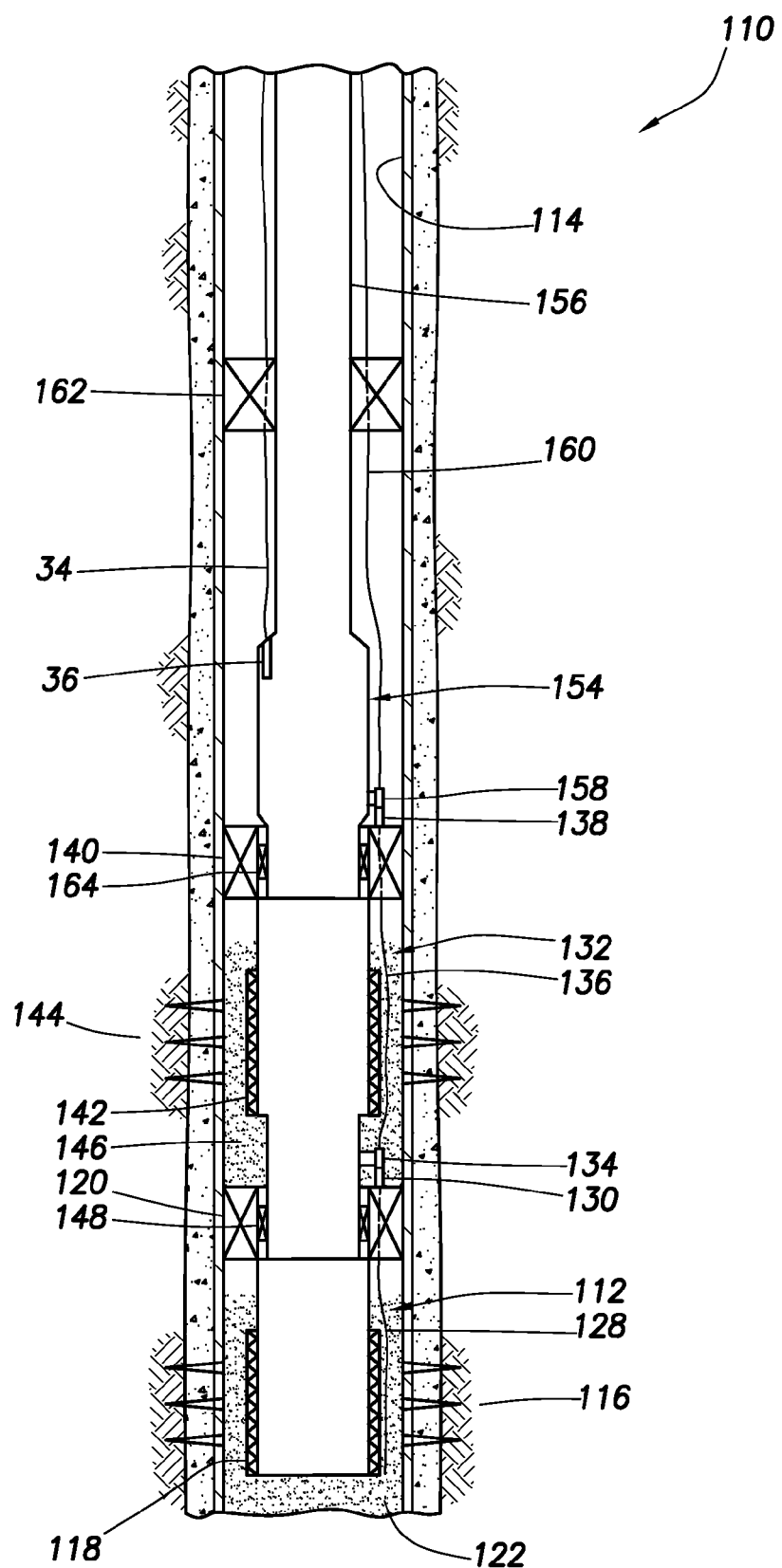

As depicted in FIG. 10, the orienting device 152 is used to rotationally orient a tubular string 156 including a housing assembly 154 relative to the gravel packing assembly 132, so that the fiber optic connector 138 is aligned with another fiber optic connector 158 carried at a lower end of the housing assembly. Preferably, the tubular string 156 is secured to the gravel packing assembly 132 when the tubular string is engaged with the gravel packing assembly, such as by using collets engaging an internal profile as described above, etc.

The fiber optic connector 158 is operatively coupled to another fiber optic line 160 extending to a remote location, such as the earth's surface or another location in the well. The fiber optic line 160 extends through a packer 162 interconnected in the tubular string 156, and generally extends external to the tubular string. However, the fiber optic line 160 could be otherwise positioned, such as internal to the tubular string 156 or in a sidewall of the tubular string, in keeping with the principles of the invention.

The housing assembly 154 may be substantially similar to the housing assembly 32 described above, with the addition of the fiber optic connector 158 and fiber optic line 160. For example, the housing assembly 154 includes the fiber optic connector 36 and fiber optic line 34 described above. As the housing assembly 154 is engaged with the gravel packing assembly 132, an orienting device (such as the orienting device 82) on the housing assembly engages the orienting device 152 on the gravel packing assembly, thereby rotationally aligning the fiber optic connectors 138, 158. Seals 164 carried on the housing assembly 154 sealingly engage a seal bore of the packer 140.

Thus, as depicted in FIG. 10, the fiber optic connectors 130, 134 are operatively connected and the fiber optic connectors 138, 158 are operatively connected. This permits the fiber optic lines 128, 136, 160 to transmit optical signals therebetween which, in turn, permits monitoring of well parameters along the intersections between the wellbore 114 and the formations 116, 144.

Unfortunately, the installed fiber optic sensors, lines, etc. could possibly malfunction or become damaged. In that event, the system 110 provides for a backup fiber optic sensing system to be installed, without the need for pulling the tubular string 156 from the well. Instead, a probe 166 (similar to the probe 48 described above) is installed in the housing assembly 154.

Figure 11:
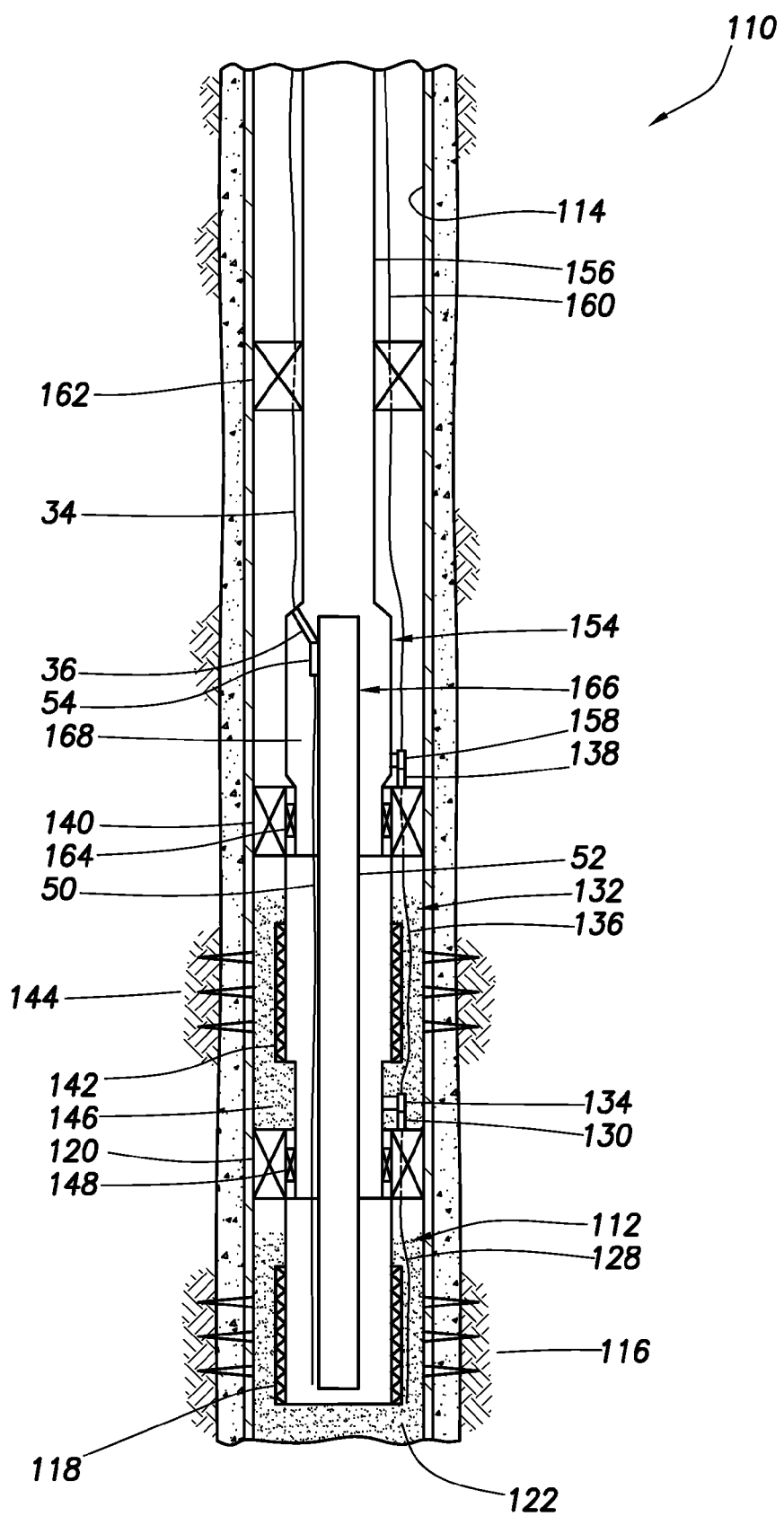

As depicted in FIG. 11, the probe 166 is conveyed into a passage 168 extending through the tubular string 156, the housing assembly 154 and the gravel packing assemblies 112, 132. The probe 166 may be conveyed into and through the passage 168 by any type of conveyance and it may be displaced by pressure or another biasing means. The probe 166 may be installed in the passage 168 either before or after the tubular string 156 is installed in the wellbore 114.

The probe 166 is engaged with the housing assembly 154 and rotationally oriented relative thereto, for example, by using orienting devices 64, 82 as described above. This rotational orientation aligns the fiber optic connector 36 with the fiber optic connector 54 carried on the probe 166. The probe 166 is anchored in the housing assembly 154, for example, using the collets 84 and sleeve 86 as described above.

The fiber optic connector 36 is displaced into operative engagement with the fiber optic connector 54, for example, using pressure applied via the running tool 46 as described above. The fiber optic connector 54 is operatively coupled to the fiber optic line 50 which, in the system 110, extends external to the tubular member 52 and longitudinally through the gravel packing assemblies 112, 132.

The fiber optic line 50 may now be used to sense parameters of fluid flowing from the formations 116, 144 into the wellbore 114 along the length of the intersections of the wellbore with the formations. Thus, the fiber optic sensing capabilities of the system 110 have been restored by installing the probe 166, and without the necessity of retrieving the tubular string 156, or either of the gravel packing assemblies 112, 132, from the well. This feature of the system 110 is particularly beneficial if the screens 118, 142 are expanding screens, since expansion of the screens could cause damage to the fiber optic lines 128, 136 and/or associated sensors.

As with the system 10 described above, the probe 166 is separately retrievable from the well, in case a portion of the probe malfunctions or becomes damaged in the well. Thus, the invention provides a fiber optic sensing system which may be retrieved and replaced without pulling a completion string from the well. This retrievability and replaceability is enhanced by the use of fiber optic connectors 36, 54 which may be oriented, aligned and connected downhole. The other fiber optic connectors 130, 134, 138, 158 permit the well to be completed in sections without the need to install a single continuous fiber optic line for monitoring parameters of fluid in the wellbore 114.

As with the systems 10, 100 described above, multiple fiber optic lines may be connected and disconnected downhole using the connectors 36, 54, 130, 134, 138, 158, and other types of lines (such as hydraulic and/or electrical) may be connected and disconnected downhole using the connectors in the system 110.

Of course, a person skilled in the art would, upon a careful consideration of the above description of representative embodiments of the invention, readily appreciate that many modifications, additions, substitutions, deletions, and other changes may be made to these specific embodiments, and such changes are contemplated by the principles of the present invention. Accordingly, the foregoing detailed description is to be clearly understood as being given by way of illustration and example only, the spirit and scope of the present invention being limited solely by the appended claims and their equivalents.

What is claimed is:

1. A method of making fiber optic connections in a subterranean well, the method comprising the steps of:
    positioning a first assembly in the well, the first assembly including a first fiber optic connector;
    positioning a second assembly in the well, the second assembly including a second fiber optic connector;
    orienting the first and second assemblies in the well, thereby aligning the first and second fiber optic connectors; the orienting step comprising rotationally orienting the first and second assemblies; and
    then operatively connecting the first and second fiber optic connectors in the well, thereby permitting light transmission between first and second fiber optic lines operatively coupled to the respective first and second fiber optic connectors, the connecting step including displacing a selected at least one of the first and second fiber optic connectors relative to a housing which supports the selected connector prior to the displacing step.

2. The method according to claim 1, further comprising the step of attaching the second assembly to the first assembly.

3. The method according to claim 2, wherein the attaching step further comprises securing the second assembly within the first assembly.

4. The method according to claim 1, further comprising the step of sealing between the first and second assemblies.

5. The method according to claim 1, wherein each of the first and second assemblies is a gravel packing assembly, and wherein the orienting step further comprises rotationally orienting the second gravel packing assembly relative to the first gravel packing assembly.

6. The method according to claim 5, wherein the first fiber optic line extends longitudinally relative to the first gravel packing assembly.

7. The method according to claim 6, further comprising the step of extending the first fiber optic line through a packer of the first gravel packing assembly.

8. The method according to claim 6, wherein the second fiber optic line extends longitudinally relative to the second gravel packing assembly.

9. The method according to claim 8, further comprising the step of extending the second fiber optic line through a packer of the second gravel packing assembly.

10. The method according to claim 1, wherein the first assembly is a gravel packing assembly, wherein the second assembly is a tubing string, and wherein the orienting step further comprises rotationally orienting the tubing string relative to the gravel packing assembly.

11. The method according to claim 10, wherein the first fiber optic line extends longitudinally relative to the tubing string.

12. The method according to claim 10, wherein the second fiber optic line extends longitudinally relative to the gravel packing assembly.

13. The method according to claim 12, further comprising the step of extending at least one of the first and second fiber optic lines through a packer of the gravel packing assembly.

14. A method of monitoring a subterranean well, the method comprising the steps of:

positioning a first fiber optic line in the well, the first fiber optic line extending in a formation intersected by the well;

positioning a second fiber optic line in the well, the second fiber optic line extending to a remote location;

then operatively connecting the first and second fiber optic lines while the first and second fiber optic lines are in the well, the connecting step comprising rotationally orienting respective first and second assemblies to thereby align first and second fiber optic connectors, thereby permitting light transmission between the first and second fiber optic lines, and the connecting step further comprising displacing a selected at least one of the first and second fiber optic connectors relative to the housing which supports the selected connector prior to the displacing step; and monitoring a well parameter using a sensor operatively coupled to the first fiber optic line.

15. The method according to claim 14, wherein in the monitoring step the sensor is a portion of the first fiber optic line.

16. The method according to claim 14, wherein the monitoring step further comprises using the sensor to sense a selected one or more of seismic, pressure, temperature, water cut, flow rate, radioactivity and phase parameters.

17. The method according to claim 14, wherein in the monitoring step there are multiple ones of the sensor distributed along the first fiber optic line.

18. The method according to claim 14, wherein the monitoring step further comprises monitoring well temperature distributed along the first fiber optic line.

19. The method according to claim 14, wherein the monitoring step further comprises identifying a location of influx of water from the formation into the well.

* * * * *